United States Patent [19]
Ahmed et al.

[11] Patent Number: 5,942,346
[45] Date of Patent: Aug. 24, 1999

[54] METHANOL PARTIAL OXIDATION REFORMER

[75] Inventors: Shabbir Ahmed, Bolingbrook; Romesh Kumar; Michael Krumpelt, both of Naperville, all of Ill.

[73] Assignee: The University of Chicago, Chicago, Ill.

[21] Appl. No.: 09/110,373

[22] Filed: Jul. 6, 1998

Related U.S. Application Data

[62] Division of application No. 08/518,541, Aug. 23, 1995.

[51] Int. Cl.$^6$ ........................................ H01M 8/06
[52] U.S. Cl. ........................ 429/20; 422/193; 423/651
[58] Field of Search ................... 429/19, 20; 423/651; 422/109, 111, 193

[56] References Cited

U.S. PATENT DOCUMENTS

| | | | |
|---|---|---|---|
| 4,365,006 | 12/1982 | Baker | 429/17 |
| 4,522,894 | 6/1985 | Hwang et al. | 429/19 X |
| 4,789,540 | 12/1988 | Jenkins | 422/111 X |
| 4,902,586 | 2/1990 | Wertheim | 429/20 |
| 5,248,566 | 9/1993 | Kumar et al. | 429/19 |

*Primary Examiner*—Stephen Kalafut
*Attorney, Agent, or Firm*—Emrich & Ditmar

[57] ABSTRACT

A partial oxidation reformer comprising a longitudinally extending chamber having a methanol, water and an air inlet and an outlet. An igniter mechanism is near the inlets for igniting a mixture of methanol and air, while a partial oxidation catalyst in the chamber is spaced from the inlets and converts methanol and oxygen to carbon dioxide and hydrogen. Controlling the oxygen to methanol mole ratio provides continuous slightly exothermic partial oxidation reactions of methanol and air producing hydrogen gas. The liquid is preferably injected in droplets having diameters less than 100 micrometers. The reformer is useful in a propulsion system for a vehicle which supplies a hydrogen-containing gas to the negative electrode of a fuel cell.

10 Claims, 7 Drawing Sheets

METHANOL PARTIAL OXIDATION REFORMER

This application is a divisional to Ser. No. 08/518,541 filed Aug. 23, 1995.

The United States Government has rights in this invention pursuant to Contract No. W-31-109-ENG-38 between the U.S. Department of Energy and The University of Chicago representing Argonne National Laboratory.

BACKGROUND OF THE INVENTION

This is an improvement in the invention described in U.S. Pat. No. 5,248,566 issued Sep. 28, 1993, the disclosure of which is herein incorporated by reference.

Fuel cells are being developed for use in automotive propulsion systems as alternatives for the internal combustion engine in buses, vans, passenger cars and other four wheel vehicles. The major motivations for developing fuel cell powered vehicles are low emissions of pollutants, high fuel energy conversion efficiencies, superior acceleration, low noise and vibration and the possible use of coal or biomass derived alcohols rather than petroleum-base fuels. Although petroleum based fuels can also be used. The present invention is directed most specifically to systems for using methanol as a fuel.

The two most important operational requirements for a stand-alone fuel cell power system for a vehicle are the ability to start-up quickly and the ability to supply the necessary power and demand for the dynamically fluctuating load. The rapid start-up requirement is obvious.

Alcohols such as methanol are likely fuels for use in fuel cells for transportation applications. Methanol is a commodity chemical that is manufactured from coal, natural gas and other feed stocks, while ethanol is often produced from grain. For use in a fuel cell, however, alcohol must first be converted (reformed) to a hydrogen rich gas mixture. The desired features for such a fuel reformer include rapid start-up, good dynamic response, fuel conversion, small size and weight, simple construction and operation and low cost.

Methanol has been used in steam reforming for providing a hydrogen rich gas stream from mobile combustion engines, see Koenig et al. U.S. Pat. No. 4,716,859 and water, as a reaction product from a fuel cell, has been recycled for use in steam reforming of methanol, see Baker U.S. Pat. No. 4,365,006. Steam reforming of methanol is endothermic and complicates, by its energy requirements, its use in a vehicle. Supplying the hydrogen rich gas on demand in an intermittent variable demanding environment is also a difficult requirement to meet and has been addressed by Ohsaki et al. U.S. Pat. No. 4,988,580 but this suggestion is not applicable to a small, mobile system. The catalytic exothermic partial oxidation-reforming of fuels to produce hydrogen-rich gas streams is known, see Rao U.S. Pat. No. 4,999,993. The use of a partial oxidation reformer had not been used in a vehicle to accomplish the purposes of this invention prior to the disclosure of the Kumar et al. '566 patent which is satisfactory for its intended purposes, but was based on theoretical considerations.

The subject invention is an improvement of that disclosed In the Kumar et al. '566 patent and relates to the use of specific reactor designs and catalyst along with mechanism for controlling the oxygen to methanol mole ratio to control operating temperatures to produce a commercially viable system.

SUMMARY OF THE INVENTION

This invention relates to a partial oxidation reformer which has a longitudinal extent at least 1.5 times its diameter and which contains an oxide catalyst for partially oxidizing and reforming mixtures of water, air and methanol into a hydrogen containing gas.

The invention, in one aspect, combines a particular oxidation reformer with a fuel cell for using the hydrogen-containing gas put out by the partial oxidation reformer and air to produce d.c. power which operates an electric motor in a transportation vehicle.

Another aspect of the invention is that the partial oxidation reformer is provided with mechanism for introducing methanol and water in small droplets and intimately mixing the droplets with air prior to partial oxidation.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

In a fuel cell system operating on methanol, the overall reaction is:

$$CH_3OH + 3/2 O_2 \rightarrow CO_2 + 2H_2O \tag{1}$$

but the methanol must first be converted to hydrogen by either the steam reforming reaction, $$CH_3OH(1) + H_2O\ (1) \rightarrow 3H_2 + CO_2 \Delta H_{298} = +131\ kJ \tag{2}$$

or the partial oxidation reaction, $$CH_3OH(1) + 1/2\ O_2 \rightarrow 2H_2 + CO_2 \Delta H_{298} = -155\ kJ \tag{3}$$

or some combination of the two. For either of these overall reforming reactions, the reaction mechanism involves several steps.

The steam reforming reaction is endothermic, i.e., requires the input of thermal energy via indirect heat transfer, leading to the need for a relatively large heat exchange surface area and consequently a large reformer. On the other hand, the partial-oxidation reaction is exothermic. No indirect heat transfer is required within the reactor. Further, since the reformer is heated up to its operating temperature by direct oxidation of the fuel, it starts much more rapidly than a steam reformer. Since no heat transfer is required, the reactor is compact and lightweight. Moreover, the system design is simple and is dynamically responsive to load changes.

The advantages of the partial oxidation reformers are compactness, a simple system design, rapid start-up capability, and good dynamic response, are especially attractive for fuel cell systems which have one or more of the following: space/weight limitations, frequent start-up and shut down, and operation at loads that vary often and rapidly. Transportation fuel cell systems represent an application where all of these features are common.

Although reaction (3) shows the partial oxidation reaction taking place with an oxygen-to-methanol mole ratio of 0.5, which may be preferred at start-up conditions, this reaction can be conducted at a lower oxygen-to-methanol ratio in which case the product also contains some carbon monoxide. Reaction (4) shows an example with an oxygen-to-methanol mole ratio of 0.25,

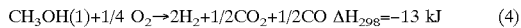

$$CH_3OH(l)+1/4\ O_2 \rightarrow 2H_2+1/2CO_2+1/2CO\ \Delta H_{298}=-13\ kJ \quad (4)$$

The carbon monoxide formed is subsequently converted to carbon dioxide and additional hydrogen via the water gas shift reaction. Reaction (5) is the water gas shift reaction:

$$CO+H_2O \rightarrow CO_2+H_2 \quad (5)$$

At an oxygen-to-methanol ratio of 0.25, the reaction is only marginally exothermic; indeed, the reaction becomes thermally neutral at an oxygen-to-methanol ratio of 0.23. Operating at a low oxygen-to-methanol ratio is also advantageous in reducing the amount of nitrogen introduced into the system.

Figure 1:
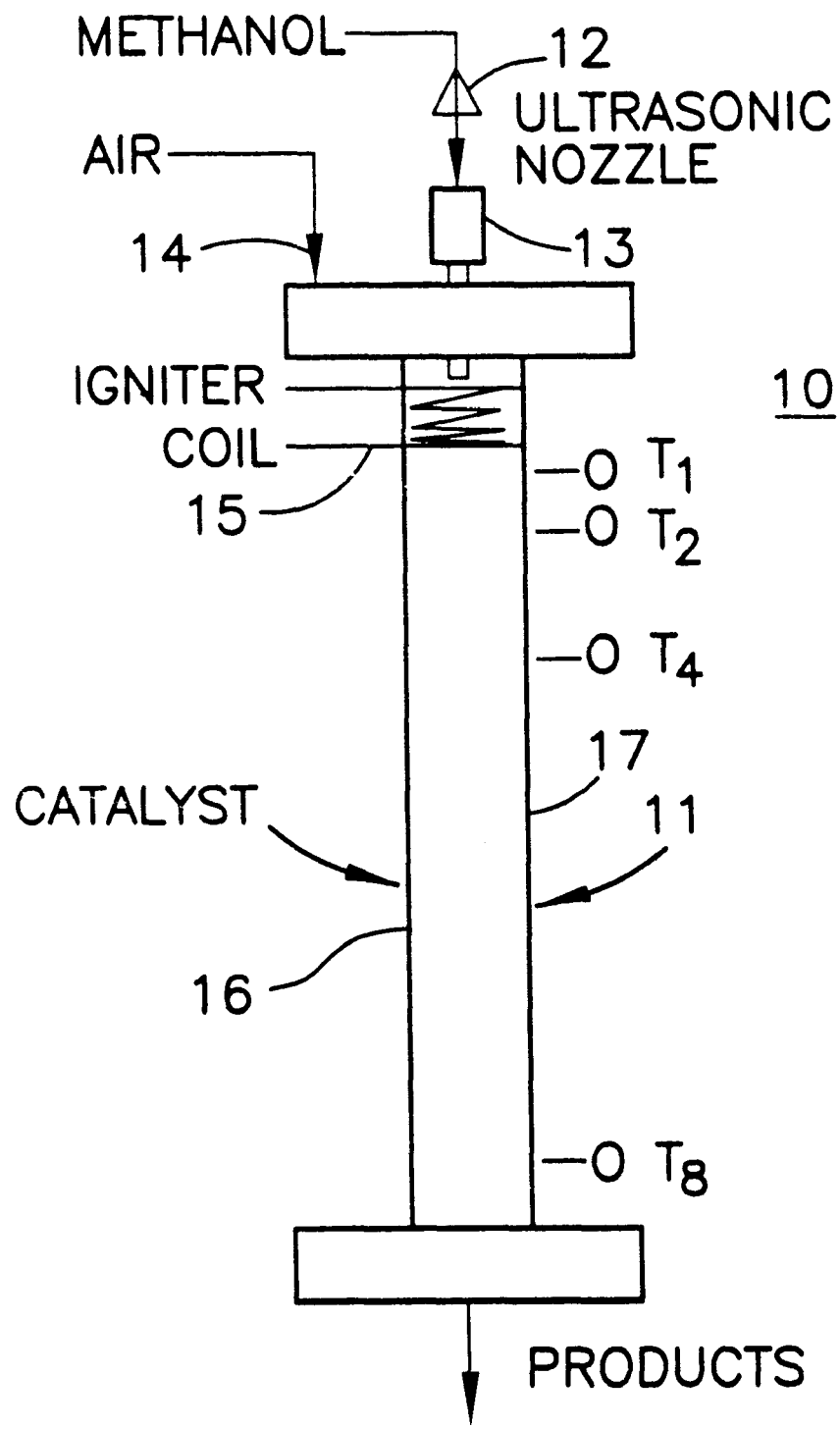
FIG. 1 is a schematic diagram of the partial oxidation reformer of the present invention.

Referring to FIG. 1, there is a partial oxidation reformer 10 for methanol. It is a compact cylindrical reaction vessel 11 with a total volume of 0.8 L. A liquid pump 12 delivers the liquid methanol to an ultrasonic nozzle 13 located at the top of the reactor 11. The nozzle 13 creates a mist of fine liquid methanol droplets and sprays it into the reactor 11. The air stream is fed in tangentially through inlet 14 from the side (similar to a cyclone separator), just above the nozzle 13 tip.

Injecting the liquid methanol as fine droplets permits uniform distribution of the methanol across the reactor cross-section. It also prevents local cold spots that might otherwise be formed by deposition of a large drop of liquid on a surface. The tangentially fed air stream creates a turbulence which facilitates a mixing between the liquid methanol droplets and air.

The methanol droplets are carried down by the air stream past an electrical igniter coil 15. The igniter 15 provides sufficient heat to vaporize part of the methanol to enable the partial-oxidation reaction in the subsequently catalyst section. The igniter mechanism may also be an electrical hot wire, a Pd catalyst, a spark plug or a glow plug.

The catalyst section consists of a ceramic honeycomb 16 (400 channels per square inch) disks coated with the copper zinc oxide catalyst. The honeycombed supports offer the advantages of uniform flow distribution and a low pressure drop within the reactor. The product stream emerges at the bottom of reactor 11. There may be a layer 17 of zirconia pellets (to serve as thermal mass) above the catalyst layer 16.

The air feed rate is used to control the reactor temperatures and hydrogen concentration in the product. The reactor temperatures increase with increasing oxygen-to-methanol mole ratio. Higher hydrogen concentration in the reformer can also be achieved by operating at low oxygen-to-methanol ratios. A ratio of 0.5 or higher is used for rapid start of the reformer; as the reformer heats up to the operating temperatures, the oxygen-to-methanol ratio is reduced to between 0.23–to about 0.4.

The reactor 11 was operated at various catalyst loadings and at various methanol and air feed rates. The reactor performance was monitored by recording flow rates, temperatures and gas compositions. The product gas was analyzed for hydrogen, carbon monoxide and carbon dioxide with the help of on-line detectors. A gas chromatograph was used to periodically analyze the gas stream for all major components (nitrogen, oxygen, carbon oxides, hydrogen, methane, water and methanol).

The reformer 10 illustrated in FIG. 1 consists of a cylindrical pipe 11 with an internal diameter of 5.1 cm (2 in.). Liquid methanol (or a methanol/water mixture) was sprayed into the top of the reactor 11 with an ultrasonic nozzle 13. Air was introduced tangentially at inlet 14 and mixed with the liquid mist as they travelled downward toward the catalyst 16. A nichrome igniter 15 is used to start up the reformer 10.

A copper zinc oxide catalyst was supported on honeycomb disks. 5-cm in diameter by 2.5-cm high, weighing ~30 g each. A number of thermocouples $T_1$–$T_8$ were used to record the temperature along the length of the reactor. Part of the reformer product stream was cooled to remove all condensables and then analyzed for hydrogen, carbon monoxide, and carbon dioxide by on-line detectors. Samples of the reformate gas were also analyzed by a gas chromatograph. The reactor has been operated at methanol liquid flow rates of 25–60 ml/min and air flow rates of 20–54 L/min. At 60 ml/min methanol and 54 L/min of air, the gas mass velocity based on the reactor cross-section is 0.1 $gs^{-1}\ cm^{-2}$, and the space velocity was 1.8 $s^{-1}$. The steady-state data reported here were obtained at oxygen-to-methanol ratios of ~0.25. This lower (than 0.5) ratio was maintained to achieve higher hydrogen concentrations in the product and, to prevent the high catalyst temperatures (detrimental to catalyst) that result from oxygen-rich feeds.

Ignition Tests

Figure 2:
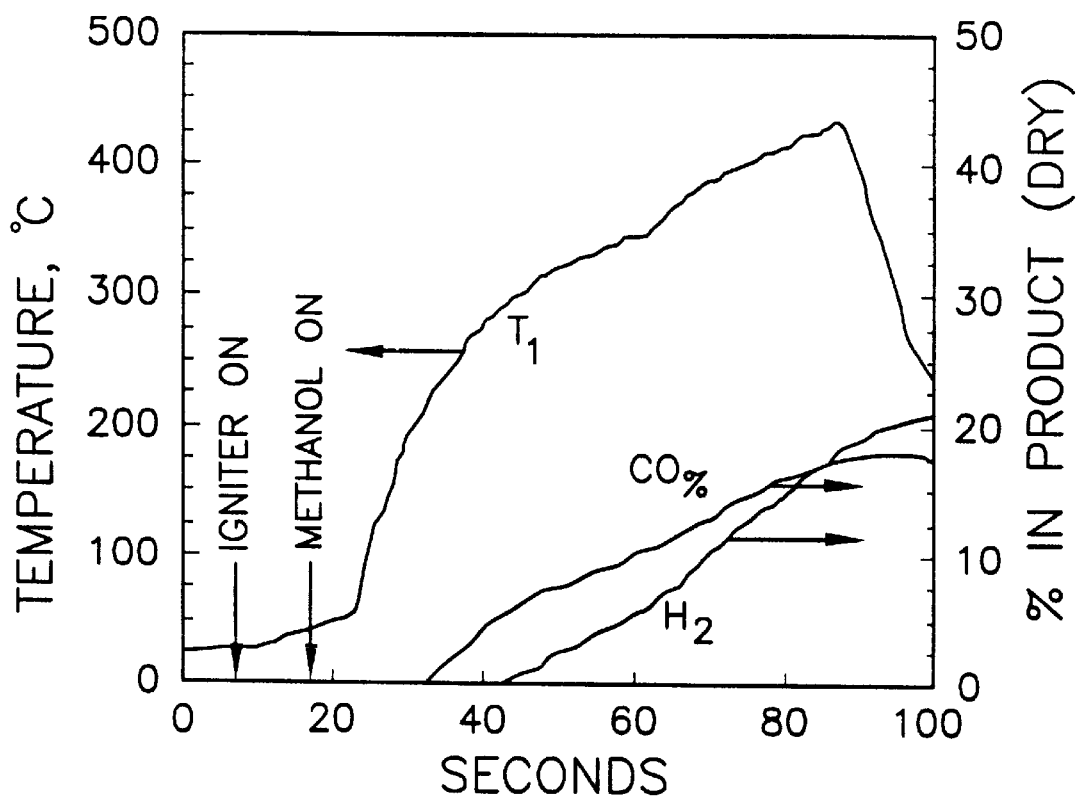
FIG. 2 is a graphical representation of the relationship of temperature and gas concentrations with time during ignition.

Each test was started with the reactor 10 at room temperature. The air flow was first established at the desired rate. The igniter power was then switched on, and the coil 15 was allowed to heat up for 1–10 s before the methanol flow was started. A typical plot of temperature and gas compositions versus time is shown in FIG. 2. The temperature just above the catalyst section (3 cm below the igniter coil) is given by curve $T_1$. The concentrations of hydrogen and carbon oxides ($CO_x$=CO—$CO_2$), on a dry basis, are also shown in FIG. 2. The $T_1$ curve shows that the ignition takes place within 5 seconds after the methanol flow is started. The first traces of carbon oxides appear 7 seconds later, and the first trace of hydrogen is observed 23 seconds after the methanol Flow is started. The delay between the $CO_x$ and $H_2$ curves is partly due to the hydrogen analyzer having a slower response time than the infrared analyzers for the carbon oxides.

Steady State Tests

Figure 3:
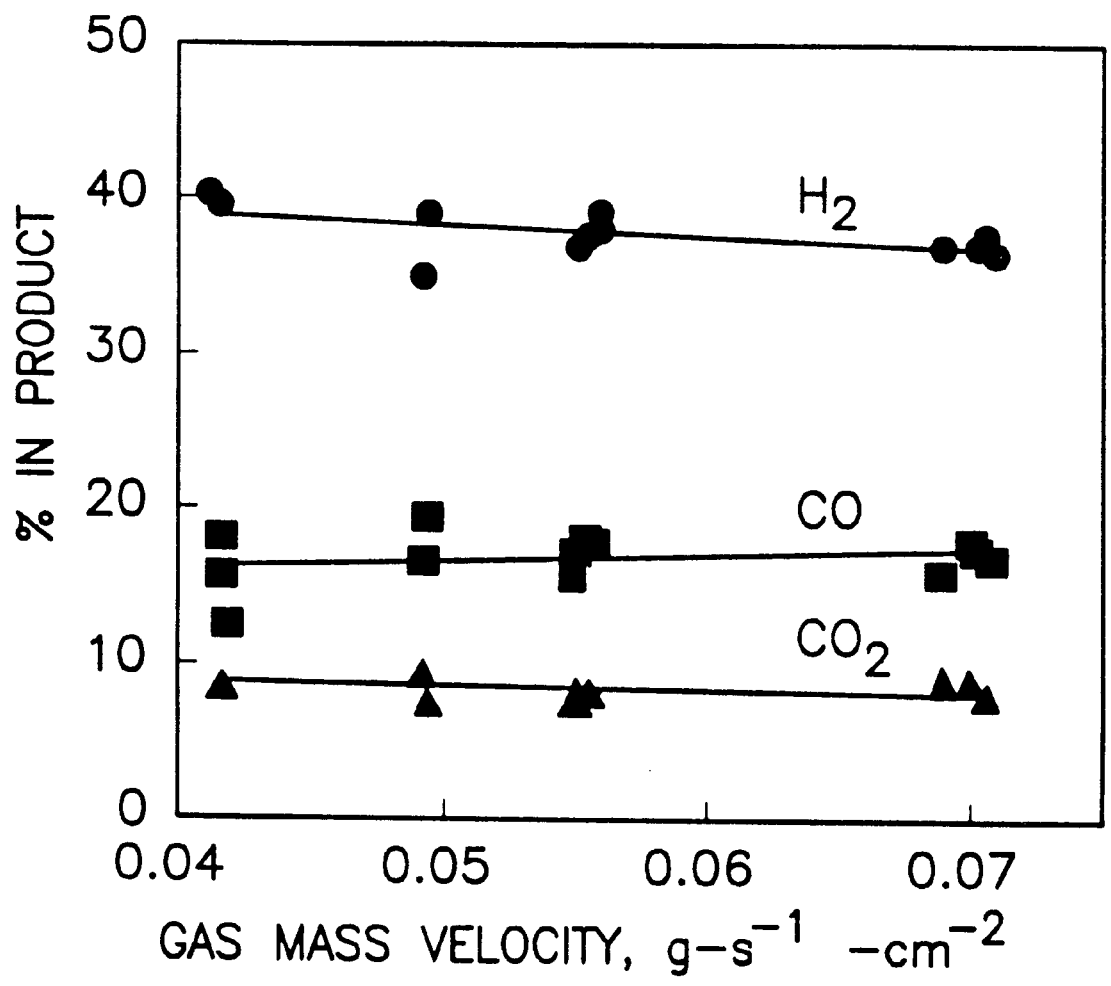
FIG. 3 is a graphical relationship of product gas distributions at steady state as a function of reactant mass velocity.

The reactor was operated at steady-state conditions at various methanol and air flow rates. The concentrations of hydrogen, carbon monoxide, and carbon dioxide as a function of the reactant gas mass velocity are shown in FIG. 3. For each of these tests the oxygen-to-methanol molar ratio was maintained at ~0.25. The data indicate that the gas compositions are slightly affected by the mass velocity: $H_2$ and $CO_2$ decrease, and CO increases at higher mass velocities. Over the range of mass velocities tested, hydrogen various from 37% to 39%; carbon monoxide 16% to 18% and carbon dioxide 8% to 9%. The product stream was found to contain 1–4% methanol and an average of 1.5% methane. The product stream, when passed through a water-gas shift reactor, would convert all the unreacted methanol and the carbon monoxide to carbon dioxide and hydrogen. Thus, the shifted reformate (neglecting further conversion of the 1–5% unreacted methanol in the gas) would yield a product containing ~47% hydrogen (dry basis). This value is 9% lower than the theoretical maximum for these reaction conditions.

Transient Tests

Figure 4:
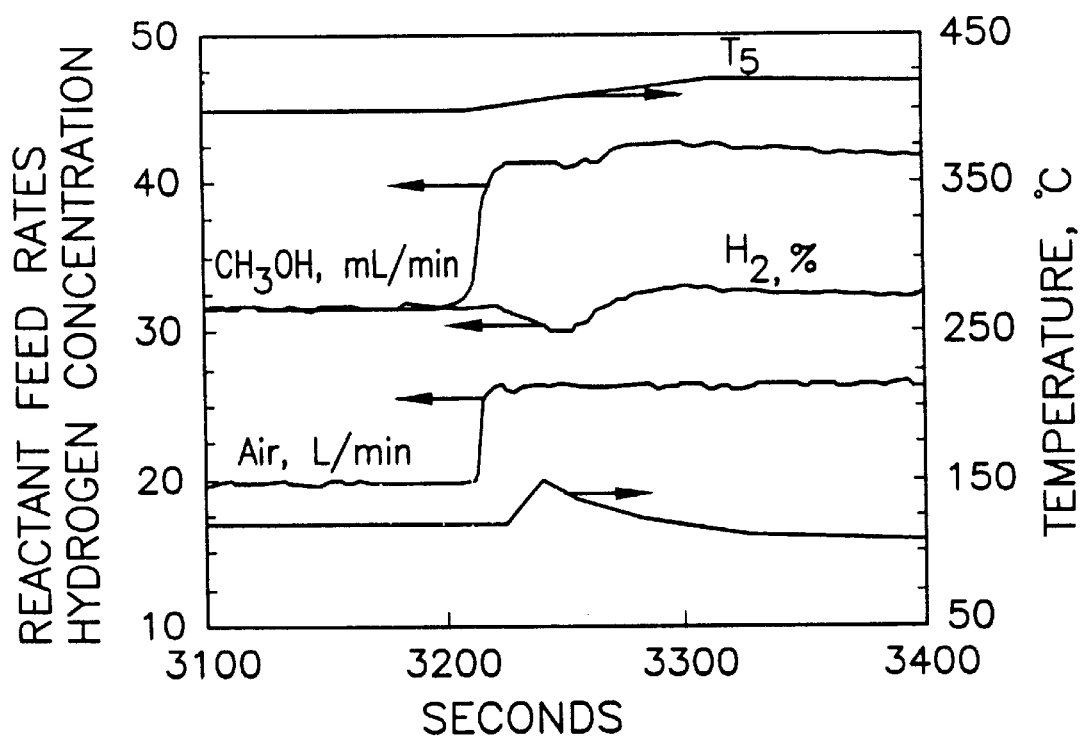
FIG. 4 is a graphical illustration of the relationships of the transient behavior of the reformer: hydrogen concentration and temperatures during a step change in processing rates with the Oxygen/Methanol Mole Ratio of 0.25.

An important requirement of reformers for transportation fuel cell systems is their ability to provide varying amounts of hydrogen on demand, while maintaining the product gas compositions. The dynamic response of the reactor 10 was tested by imposing a step change in the reactant flow rates while maintaining a constant oxygen to methanol ratio. An example is shown in FIG. 4, where the methanol flow rate was increased by 33%, from 30 to 40 ml/min, accompanied by a proportional increase in the air flow rate. The resulting effect on hydrogen concentration and the temperatures just above and just below the catalyst bed, $T_4$ and $T_8$, respectively, are shown in the figure. If the hydrogen production rate had not increased after the step change, the increase in the air flow alone would have dropped the hydrogen concentration to 28%. The hydrogen curve in the figure, however, shows only a minor (1.5%) and temporary drop to 30%. This indicates that the amount of hydrogen produced also increased with the increase in feed rate. The hydrogen concentration returns to its original level in ~80 seconds. Among the temperature curves, $T_8$ shows a damped response, compared to $T_4$ because of the thermal mass (catalyst and walls) between the two thermocouples.

Figure 5:
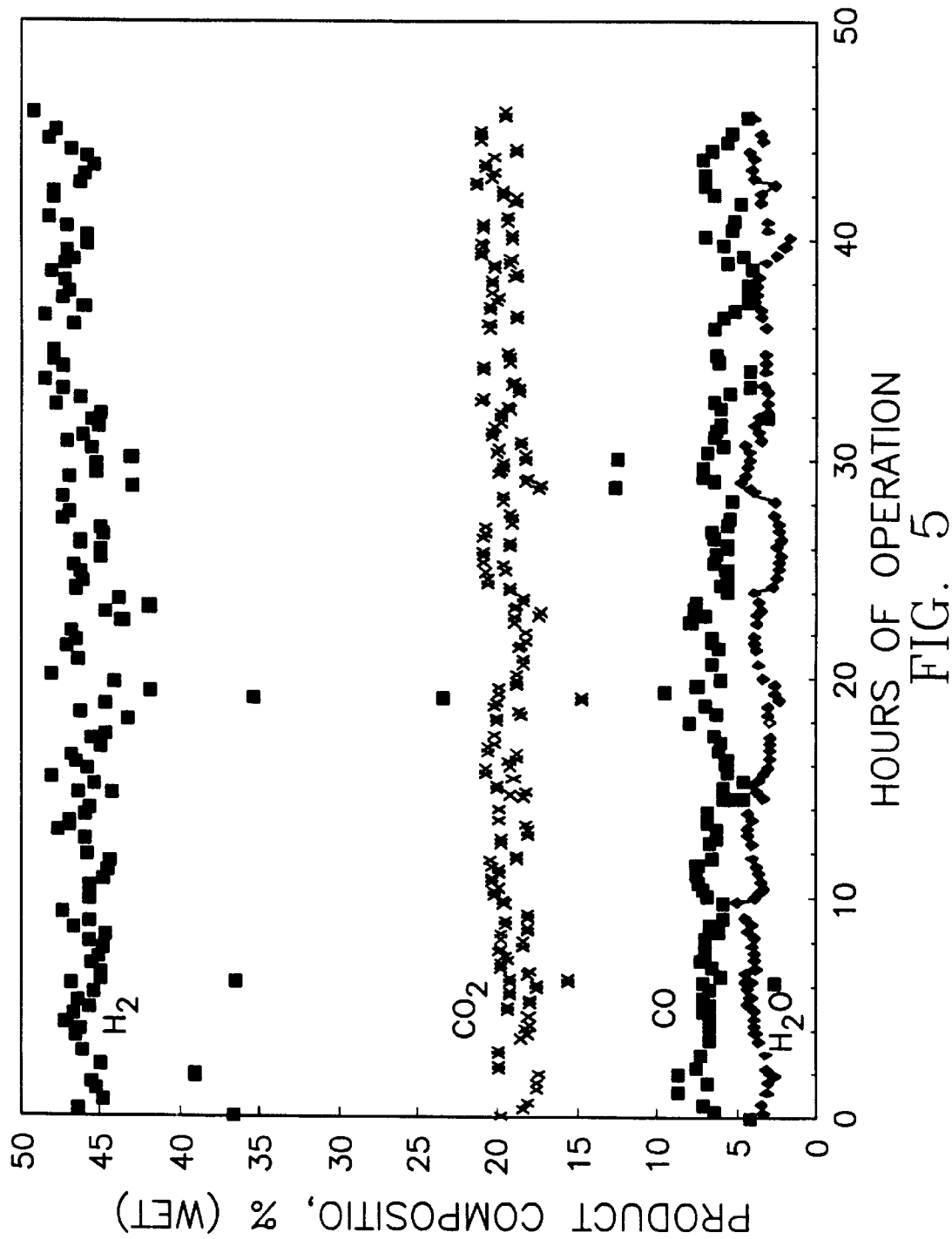
FIG. 5 is a graphical representation of the product compositions with hours of operation via partial oxidation reformer.
Figure 6:
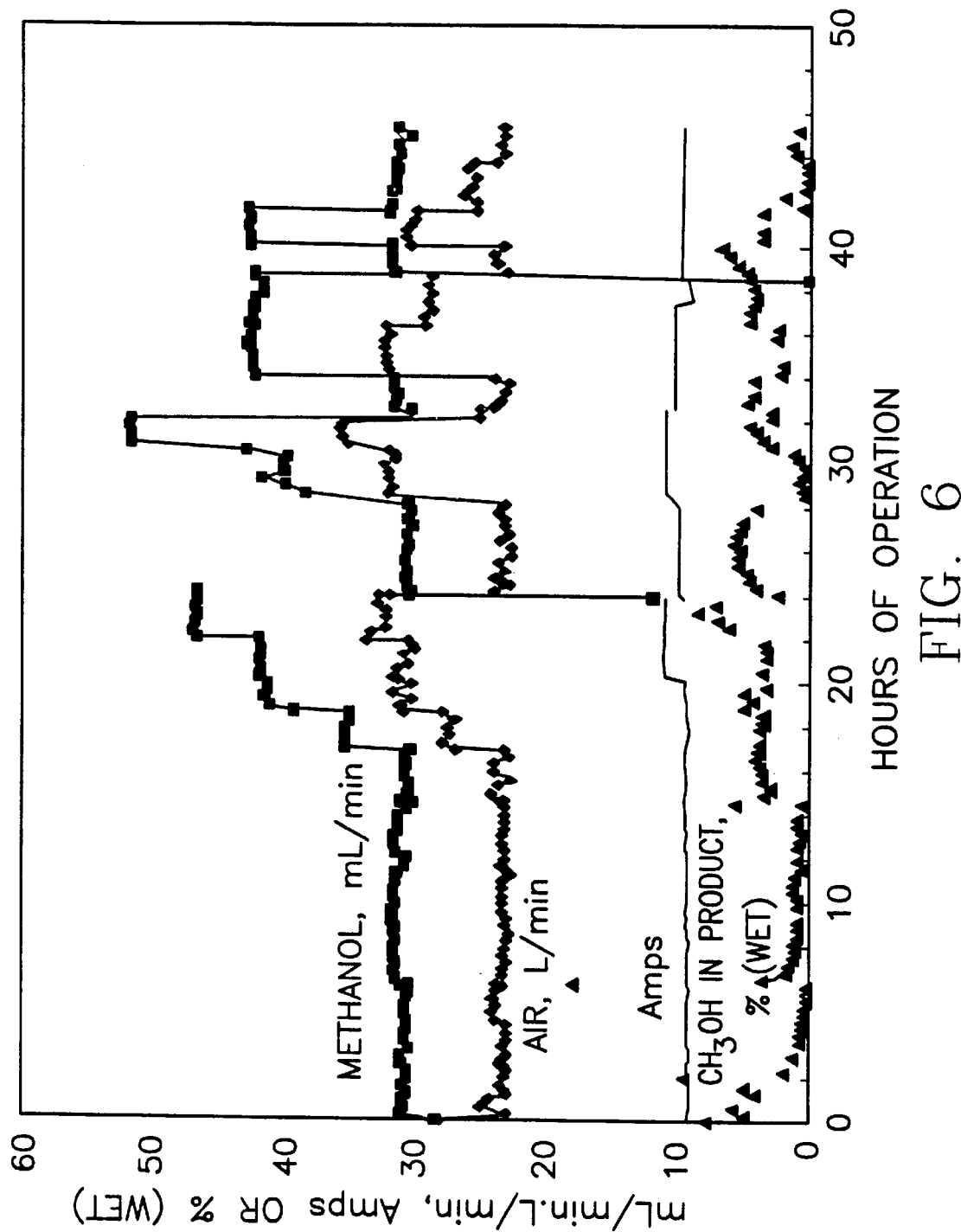
FIG. 6 is a graphical representation of the relationship between the feed rates of methanol and air, the current to the igniter and the methanol and the product with the hours of operation.

Referring to FIGS. 5 and 6, there is shown the relationships for the methanol and air feed rate as well as the amperage to the ignition coil for almost fifty hours of operation and the product mix (FIG. 5) as well as the unreacted methanol in the product (FIG. 6). Of importance is the fact that the amount of hydrogen in the product stays relatively constant between about 45 and 50% even during variations in the methanol feed rate and the amount of methanol in the product also remains relatively constant if under 10% showing that over 90% of the methanol is reacted in the reformer of the present invention.

Figure 7:
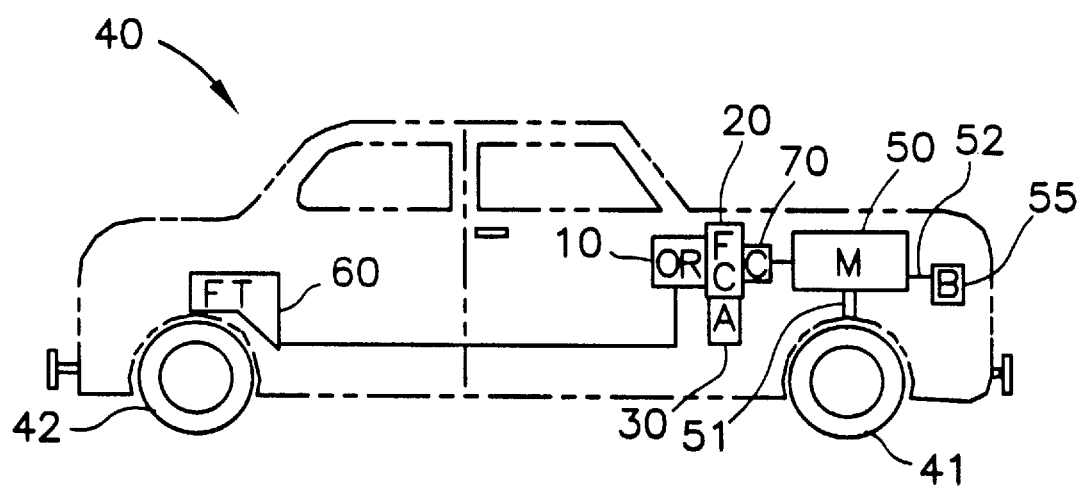
FIG. 7 is a schematic illustration of a vehicle incorporating the partial oxidation reformer and a fuel cell combination.

Referring now to FIG. 7, there is illustrated an automobile 40 representative of the type of vehicles in which the subject invention is useful. The vehicle 40 is provided with a pair of front wheels 41, a pair of rear wheels 42, and an electric motor 50 connected to one of the pairs 41, 42 as by a drive shaft 51 and is electrically connected by suitable means 52 to a battery 55. The battery 55 can be used to start the vehicle 40 in the same manner batteries function with internal combustion engines and to run accessories. A partial oxidation reformer 10 of the type previously described, is in liquid or gas communication with a fuel tank 60 and is connected to a fuel cell 20 of the type previously described. An afterburner 30 is connected to the off gases from the negative electrode or anode 21 of the fuel cell and is used to react the remaining hydrogen in the gas leaving the anode 21 to extract heat therefrom for either heating or cooling the passenger compartment of the automobile 40, as required. A motor controller 70 is interposed between the fuel cell 20 and the electric motor 50 and coordinates the dc power output from the fuel cell 20 and the variable speed requirements for the motor 50. Such motor controllers are well known in the art. Also in FIG. 7, there is illustrated a single feed from the fuel tank 60 to the partial oxidation reformer 10, it may be that multiple feeds will be provided to the partial oxidation reformer 10. Moreover, it is possible that the partial oxidation reformer 10 will be a multiple zone reformer, with the final zone thereof containing either an oxidation catalyst for converting carbon monoxide to carbon dioxide or containing a methanation catalyst for converting carbon monoxide to methane.

The main object of this invention is obtained by the combination of the partial oxidation reformer 10 and the fuel cell 20 which provides rapid response to variable acceleration demands by the motor 50 due to the exothermic reaction, thereby obviating the need for thermal energy input to the partial oxidation reformer 10 during periods of acceleration or increased power demand.

Other objects of this invention have been attained by the novel partial oxidation reformer 10 disclosed having means for mixing droplets of methanol and air in a turbulent zone in the reactor, alone or in combination with a fuel cell suitable for a vehicle and in combination with the necessary components for a vehicle.

A variety of catalysts may be used, preferably the catalyst is an oxide catalyst and more preferably, the catalyst is one or more of copper oxide-zinc oxide, FeZnO and cobalt supported on silica. The copper oxide-zinc oxide is preferred and, as previously indicated, it is preferred to be supported on a honeycomb support for the purposes and advantages hereinbefore set forth.

At initial start-up, it is preferred that the oxygen to methanol mole ratio be higher than 0.5; however, a steady state is preferred that the oxygen to methanol mole ratio be in the range of from about 0.23 to about 0.4. By controlling the oxygen to methanol mole ratio, the temperature of the reactants in contact with the catalyst is controlled. Preferably, the temperature of the reactants in contact with the catalyst is less than about 500° C., and more particularly less than about 450° C. The preferred temperature is between about 350–400° C.

Another important aspect of the present invention is the size distribution of the methanol droplets, it being preferred that the size distribution be in the range of from about 20 to about 50 micrometers. It is also advantageous to have the droplet size be less than about 50 micrometers and less than about 100 micrometers will provide advantages.

Another important aspect of the invention is the turbulence generated by introducing the air through the inlet 14 tangentially to the fine droplets of methanol introduced through the ultrasonic nozzle 13. By introducing the air tangentially, turbulence is encouraged and therefore, intimate mixing of the air and methanol occurs and also helps prevent liquid droplet deposition on the reactor wall.

It is contemplated that a minor amount of water will be added with the methanol in order to facilitate conversion of the carbon monoxide via the water shift reaction previously set forth to carbon dioxide. The amount of water in the methanol is preferably less than about 50 volume percent and more preferably in 20–30% volume range.

Because it is disadvantageous for large droplets of liquid to contact the catalyst bed 16, there may be inserted between the catalyst bed 16 and igniter coil 15, a bed of ceramic particles, for instance, zirconia. These particles may be ¼ inch pellets of zirconia whose purpose is simply to insure that liquid drops of water and methanol do not intermittently contact the active catalyst. If the catalyst is contacted with too much liquid, the temperature of the catalyst drops and the catalyst may become temporarily inert, until it heats up again.

The present invention is particularly useful with fuel cells of the type described in FIG. 2 of the incorporated '566 patent, with the product from reactor 10 being directed to the anode of the fuel cell illustrated in the '566 patent.

The methanol partial oxidation reformer's advantages can best be described relative to the other reformers being developed or used with fuel cell systems. These prior art reformers are based on the steam reforming reaction, where the reactants, methanol and water, are first vaporized and preheated before they can be fed into the reactor. The inventive partial oxidation reformer requires no pre-vaporization or preheating.

The steam reforming reaction itself is strongly endothermic and so considerable heat must be provided in order to maintain the reactor temperatures. Since the heat transfer is indirect, i.e., transferred from across a solid wall, the required rate of heat transfer is accomplished with a large heat transfer area. Consequently, the reactor designs become complex, large and heavy. Moreover, a burner is required to generate the heat that is to be provided to the reactor. The partial oxidation reformer, in contrast, is a simple cylindrical piece of hardware 10. No heat exchange surfaces are required, and therefore, this type of reactor is compact and lightweight.

During cold starts, the steam reformer catalysts must be heated by passing hot gases on the other side of a wall. This is a slow process and requires a long time. For example, the start-up times for the steam reformer in the DOE fuel cell takes ~45 minutes to reach operating temperatures. The partial oxidation reformer operates on an exothermic reaction which heats up the gas stream and the catalyst simultaneously. This enables this reactor 10 to have very short start-up times. The methanol partial oxidation reformer developed herein has reached operating temperatures within 1 minute (FIG. 2).

Fuel cell systems using steam reformers are limited in their dynamic response. This is because during load changes both feed and heat input rates into the reformer need to change simultaneously. While the feed rate can be increased rapidly, the heat input is much slower because it occurs by indirect heat transfer. The partial oxidation reformer requires no indirect heat exchange and therefore can respond to load changes as fast as the feed rates can be changed.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A propulsion system for a vehicle comprising a fuel cell having, a positive electrode and a negative electrode separated by an electrolyte, mechanism for forming methanol droplets of less than about 50 micrometers in diameter with or without water, means for partially oxidizing methanol droplets of less than about 50 micrometers in diameter with or without water in a mixture containing methanol droplets and air in the presence of an oxide catalyst in an overall exothermic reaction continuously to produce a hydrogen-containing gas at a temperature less than about 500° C., means for delivering said hydrogen-containing gas to said negative electrode of said fuel cell, and means for delivering air to said positive electrode of said fuel cell to produce d.c. power for operating an electric motor in a vehicle.

2. The propulsion system of claim 1, wherein said means for partially oxidizing methanol droplets is a reaction chamber having a longitudinal extent at least 1.5 as great as the diameter with a methanol inlet parallel to the longitudinal axis of said chamber and an air inlet tangential to the longitudinal axis of said chamber to provide mixing of said methanol droplets and air.

3. The propulsion system of claim 2, wherein said catalyst is one or more of CuO—ZnO, FeZnO and Co supported on $SiO_2$.

4. The propulsion system of claim 3, wherein said catalyst is CuO—ZnO.

5. The propulsion system of claim 4, wherein a steady-state reaction temperature is controlled by means for varying the oxygen to methanol mole ratio in the range of from about 0.25 to about 0.4 and a start-up reaction temperature is controlled by maintaining the oxygen to methanol mole ratio at about 0.5 or greater.

6. The propulsion system of claim 5, wherein the steady-state temperature of the reactants is maintained at a temperature below about 450° C. for steady-state operation.

7. The propulsion system of claim 6, wherein a bed of ceramic pellets is positioned in said reaction chamber between said methanol inlet and said catalyst.

8. The propulsion system of claim 7, and further comprising means for introducing a minor amount of water into said reaction chamber to mix with said methanol droplets and air.

9. The propulsion system of claim 8, wherein said minor amount of water is less than 20% by volume.

10. The propulsion system of claim 9, wherein said minor amount of water is not greater than 30% by volume.

* * * * *